United States Patent
Soroko (10) Patent No.: US 9,767,627 B2
(45) Date of Patent: Sep. 19, 2017

(54) METHOD AND APPARATUS FOR PROVIDING VEHICLE SECURITY

(71) Applicant: Entrust, Inc., Dallas, TX (US)

(72) Inventor: Jason Aurele Soroko, Timmins (CA)

(73) Assignee: Entrust, Inc., Dallas, TX (US)

( * ) Notice: Subject to any disclaimer, the term of this patent is extended or adjusted under 35 U.S.C. 154(b) by 94 days.

(21) Appl. No.: 14/795,072

(22) Filed: Jul. 9, 2015

(65) Prior Publication Data

US 2016/0012653 A1   Jan. 14, 2016

Related U.S. Application Data

(60) Provisional application No. 62/023,388, filed on Jul. 11, 2014.

(51) Int. Cl.
| | | |
|---|---|---|
| *G07C 9/00* | (2006.01) | |
| *G07C 5/08* | (2006.01) | |
| *G07C 5/00* | (2006.01) | |
| *B60R 25/20* | (2013.01) | |

(52) U.S. Cl.
CPC ......... *G07C 9/00007* (2013.01); *G07C 5/008* (2013.01); *G07C 5/0808* (2013.01); *G07C 9/00309* (2013.01); *B60R 25/2018* (2013.01); *G07C 2009/00769* (2013.01); *G07C 2205/02* (2013.01)

(58) Field of Classification Search
CPC .. B60R 25/2018; G07C 5/008; G07C 9/0007; G07C 9/00309; G07C 2205/02; G07C 2009/00769; G07C 9/00007; H04L 9/3271

USPC .................................................. 340/5.61, 5.1
See application file for complete search history.

(56) References Cited

U.S. PATENT DOCUMENTS

| | | | |
|---|---|---|---|
| 8,222,989 B2* | 7/2012 | Ziska | B60R 25/2018 340/5.1 |
| 8,452,482 B2* | 5/2013 | Cramer | G07C 5/0808 340/438 |
| 2007/0100520 A1 | 5/2007 | Shah et al. | |
| 2009/0207004 A1 | 8/2009 | Ziska et al. | |
| 2010/0205429 A1 | 8/2010 | Alrabady et al. | |
| 2011/0144854 A1 | 6/2011 | Cramer et al. | |
| 2013/0253760 A1 | 9/2013 | Berman et al. | |
| 2014/0195100 A1 | 7/2014 | Lundsgaard et al. | |

OTHER PUBLICATIONS

European Patent Office; International Search Report and Written Opinion; International Application No. PCT/US2015/039690; dated Sep. 22, 2015.

* cited by examiner

*Primary Examiner* — Ali Neyzari
(74) *Attorney, Agent, or Firm* — Faegre Baker Daniels LLP (57) ABSTRACT

Apparatus, systems and methods are disclosed that utilize a vehicle user's input to provide logical context of legitimate vehicle usage through a remote access device to defend the vehicle from theft. As such, an additional level of security is employed and may be used in addition to other security and theft prevention technologies of the vehicle. In one example, a legitimate automobile operator signals the context of the vehicle's state to a hardware security module in the vehicle. The states include, for example, to disallow all diagnostic system access or to allow diagnostic access for servicing.

10 Claims, 12 Drawing Sheets

METHOD AND APPARATUS FOR PROVIDING VEHICLE SECURITY

RELATED APPLICATIONS

This application claims priority to Provisional Application Ser. No. 62/023,388, filed on Jul. 11, 2014, having inventor Jason Aurele Soroko, titled "METHOD AND APPARATUS FOR PROVIDING VEHICLE SECURITY," and is incorporated herein by reference.

BACKGROUND OF THE DISCLOSURE

The application relates generally to vehicle security systems and more particularly to vehicle security systems that may be activated with remote access devices, such as key fobs, smart phones, Internet appliances, and any other suitable remote access device.

Modern automobiles contain electronic control units and sensors connected to networks. The Controller Area Network (CAN) system was first implemented in 1986 and has become a standard implementation for automobile electronics. Door lock actuators, engine starter, and theft prevention sensors are electronically connected to the same computer network as the automobile diagnostic system. Door locks, engine starter and theft prevention sensors can therefore be commanded from electronic inputs issued into the physical diagnostic port (OBD-II). In some vehicles, this capability is also available remotely by wireless connectivity by a device such as an electronic key fob or a smart phone. There are many legitimate uses for starting an automobile engine and locking or unlocking the doors remotely. There are also many legitimate uses for physically accessing the automobile diagnostic OBD-II port in order to obtain diagnostic information.

Figure 1:
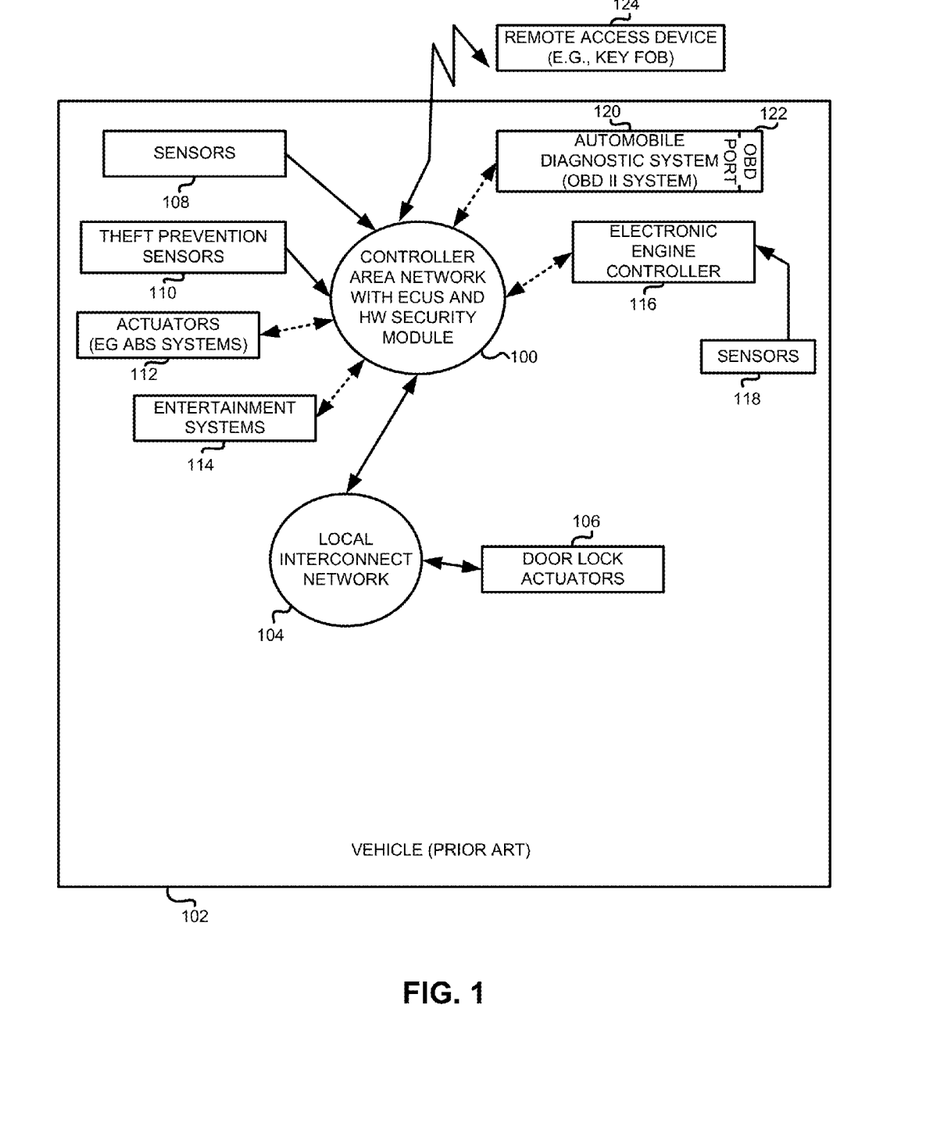
FIG. 1 is a block diagram of a prior art vehicle system.

FIG. 1 illustrates one example of known vehicle configuration. It will be recognized that other components are also utilized. As shown, a controller area network (CAN) 100 is a network that allows multiple electronic control units located throughout the engine and vehicle to communicate with one another through various links. In addition, the CAN includes a hardware security module which is designed to be tamper proof and therefore difficult for an attacker to access, modify or bypass. Hardware security modules, as known in the art include one or more processors, such as a central processing unit and associated memory wherein the memory stores executable instructions that when executed, cause the processor to perform security operations. An example of security operations currently performed by a vehicle HSM can include work done by the EVITA project. EVITAs goals are:—All Cryptographic operations are inside the HSM: all keys are stored inside the HSM. Keys have usage flags (encrypt, decrypt, sign, verify). An example of a use case may be a Valet Parking Privacy Application. There is secure access and storage of personal usage data in connection with vehicle usage such as information from usage of an infotainment service, or driving activity recording system. Another example may be an activity such as braking in one car can cause activation of brakes in another car. Communication is secured through the HSM.

In another use case, data is sent to a display and is signed by keys stored in the HSM. The vehicle 102 may be, for example, a car, truck, or any other suitable vehicle. The vehicle systems also include one or more local interconnect networks (LIN) 104 that is in communication with the CAN through one or more communication links. The LIN may allow access to door lock actuators 106 and other actuators and devices. The vehicle also includes various sensors 108, theft prevention sensors 110, actuators 112, such as anti-lock brake system actuators, entertainment systems 114, an electronic engine controller 116 that may also be interconnected with other sensors such as emission control sensors, speed sensors, and other sensors 118 as known in the art, and an automobile diagnostic system 120 such as an OBD II system with a diagnostic port 122 such as an OBD-II port. The OBD-II port may be accessed as known in the art to obtain diagnostic information, and other information from the automobile diagnostic system. Users of the vehicle may be assigned a remote access device 124 such as a key fob that has a wireless transceiver to communicate with the vehicle's CAN to unlock doors, open trunks, start the vehicle, and perform other operations.

Defensive systems such as a check for the presence of a physical key have been defeated by the thief's ability to copy the physical key. Defensive systems which check for an electronic signal or digital signature either embedded on the physical key or the remote key fob have also been defeated. Weak implementations of physical and electronic key security have led to malicious physical access to a vehicle.

If an automobile thief is able to gain physical or remote wireless access to the automobile diagnostic electronic system they would be able to issue electronic commands to unlock the doors to allow physical access as well as start the engine. Additionally, in any complex electronic system there is the possibility of implementation flaws that will enable a malicious actor to assume control. Therefore, there is a need for more than one layer of defensive security.

Automobile diagnostic systems will accept commands without authentication. In the future, if automobile diagnostic systems to perform an authentication, the automobile will still not be able to know whether or not the action of authentication was performed by the legitimate automobile operator or the malicious thief Authentication implementation flaws and fundamental weakness of authentication secrets highlight the need for an additional layer of defensive security.

Figure 2:
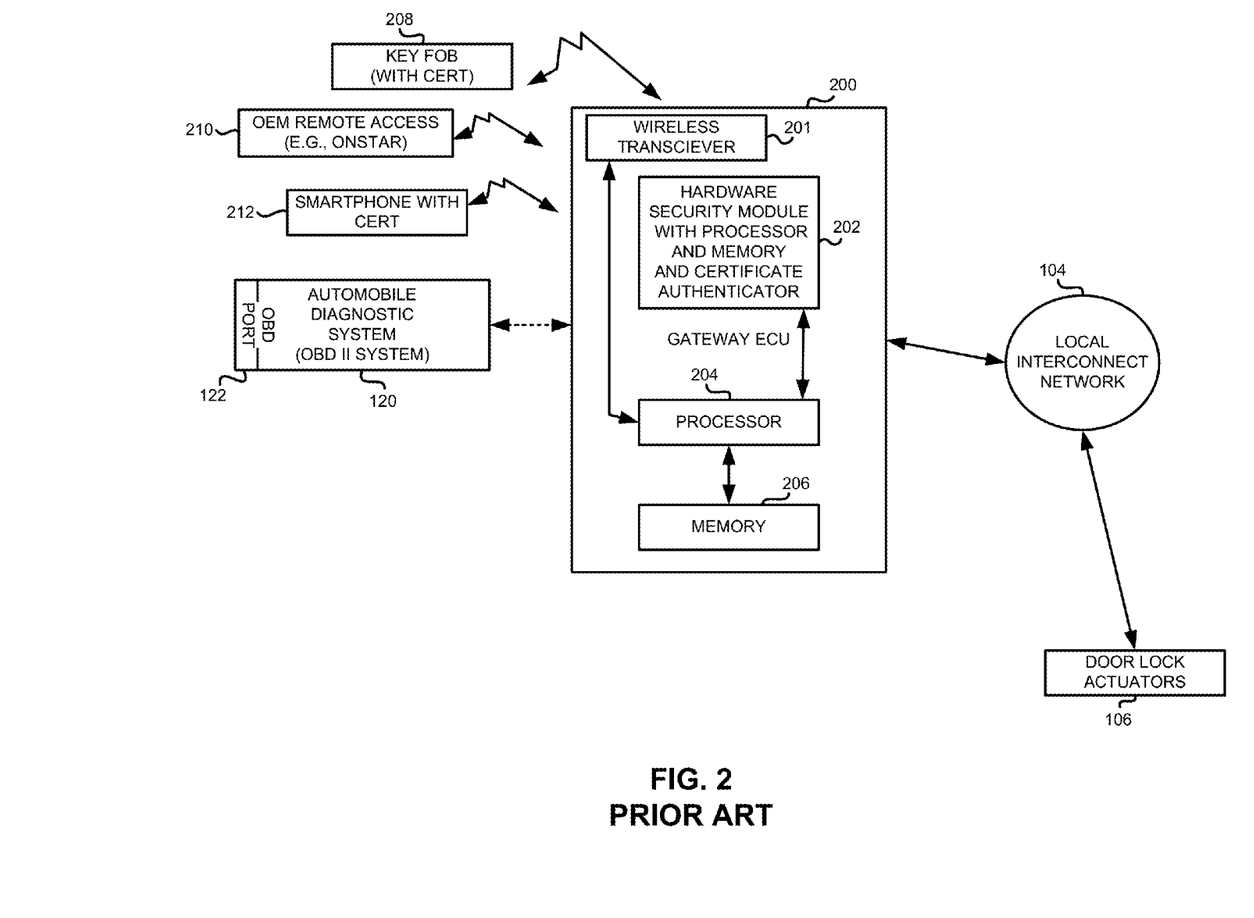
FIG. 2 is a block diagram of a prior art gateway electronic control unit in a vehicle.

FIG. 2 illustrates an example of a gateway ECU 200 that may be employed as part of the CAN 100. A hardware security module 202 may be employed as part of the gateway ECU or will be connected thereto in a secure manner. The hardware security module includes one or more processors and associated memory that allows software to be executed by the processor to cause the processor to perform operations. The gateway ECU 200 also includes one or more processors 204 and associated memory 206. The gateway ECU 200 may also include a wireless transceiver 201 or be in communication with a wireless transceiver in the vehicle to allow communication to the remote access devices, shown in this example to be a key fob 208, OEM remote access system 210 such as OnStar, or smart phone 212.

It has been proposed to provide symmetric cryptography between the remote access devices and the hardware security module in a gateway ECU to, for example, store a vehicle's certificate which has a unique vehicle ID. In addition, the remote access devices also are manufactured with corresponding symmetric certificates so that the key fob and HSM can perform an authentication operation so that the HSM and the gateway ECU can authenticate, for example, a key fob or other devices using a symmetric key authentication process to identify the key fob as properly corresponding to a particular vehicle so it can be trusted.

However, a problem can arise with such systems since a hacker can obtain this symmetric key based certificate from a key fob and program it into another key fob thereby allowing a hacker to access and steal the vehicle. This is because the vehicle allows access to the diagnostic system once the symmetric key base certificates have authenticated. A parked vehicle, for example, will still allow access to its diagnostic system, for example, through the OBD port. A vehicle may have many access points such as Bluetooth, WiFi, or the OBD port.

It has also been proposed to use an asymmetric public key infrastructure system wherein an OEM may serve, for example, as a root certificate authority (e.g., a server controlled by the OEM) and an HSM authenticates a key fob as being a genuine part of the manufacturer since the manufacturer will issue the public key and private key pair for the HSM and key fob. However, the proposed systems still allow OBD access with a parked vehicle or a vehicle that has been locked with a remote access device.

Also, while a car is driving, electronic systems coordinate with one another to accomplish pre-programmed tasks. If an operator applies the braking system hard under specific circumstances, ABS braking enables the operator to maintain control over steering while carefully balancing break caliper application. Adaptive cruise control enables more intelligence in the driving experience by helping the operator to control throttle and breaks automatically, in coordination with camera sensors. Assisted parallel park logic helps the operator by automating a series of steering movements. These electronic advancements have led to increased safety and convenience for the operator.

If ABS braking or assisted parallel parking were to be applied while at high speed, the results could be catastrophic for the passengers of the automobile. Unfortunately, this scenario is possible due to the electronic connectivity of the automobile's computer network and the trusting nature of the electronic control units. Electronic safety mechanisms can be bypassed and defeated. Most worryingly, unlike a normal personal computer, the amount of time that an attacker might need to apply an electronic denial of service attack, or a timing attack, only needs to be seconds while an automobile is traveling at high speed before an automobile might collide with another vehicle or a roadside fixture.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, apparatus, systems and methods are disclosed that utilize a vehicle user's input to provide logical context of legitimate vehicle usage through a remote access device to defend the vehicle from theft. As such, an additional level of security is employed and may be used in addition to other security and theft prevention technologies of the vehicle. In one example, a legitimate automobile operator signals the context of the vehicle's state to a hardware security module in the vehicle. The states include, for example, to disallow all diagnostic system access or to allow diagnostic access for servicing.

When diagnostic servicing is disallowed, electronic controllers in the automobile do not respond to commands. This may include the electronic control unit known as the Gateway ECU and any other electronics which communicate with the LIN bus (Local Interconnect Network). The LIN bus is typically the electronic network which issues commands to the door lock actuator. Diagnostic commands which lead to the unlocking of doors and starting the engine are not allowed to move across the CAN, LIN, FlexRay, or any other automobile network while the automobile is in the mode of disallowing diagnostic servicing. If a thief gains malicious physical access to the parked vehicle, they cannot issue electronic commands to the automobile computer network through the physical diagnostic port, or through remote wireless connectivity.

An apparatus for providing vehicle security for a vehicle includes a security module that includes an asymmetric key based cryptographic engine to authenticate a vehicle remote access device based on a public key associated with the vehicle remote access device. The security module is also operative to establish a secure link with the vehicle remote access device. The security module includes logic to selectively prevent access to a diagnostic system of the vehicle in response to vehicle security context information received from the vehicle remote access device via the established secure link. In one example, the security module is a hardware security module with a tamper resistant hardware structure.

The logic may selectively prevents access to the diagnostic system of the vehicle. For example, when the diagnostic system receives a command, it will only be run if it is signed by a cryptographic key stored in the HSM. This signing will not occur if the security state is 'on', meaning that the user of the car has signaled their intention that the car is not to be used and the car is not intended for servicing.

In another embodiment, a vehicle remote access device includes a wireless transceiver and logic coupled to the wireless transceiver, operative to facilitate public key based authentication with a vehicle electronic control unit. The vehicle remote access device also includes a user interface, such as buttons or a graphic user interface or both, provides vehicle security context information for the vehicle electronic control unit to prevent access to a diagnostic system of the vehicle.

In another embodiment, a method performed by a device in a vehicle includes authenticating a vehicle remote access device based on a public key associated with the vehicle remote access device, establishing a secure link with the vehicle remote access device, and selectively preventing access to a diagnostic system of the vehicle in response to vehicle security context information received from the vehicle remote access device via the established secure link.

In one embodiment, a vehicle system includes a vehicle remote access device that includes a wireless transceiver, first logic, operatively coupled to the wireless transceiver that is operative to facilitate public key based authentication with a vehicle electronic control unit. The remote access device, such as a key fob, smart phone or other device, includes a user interface, such as a button, graphic user interface or any suitable selection mechanism operatively coupled to the logic. The remote access device provides vehicle security context information for the vehicle electronic control unit to prevent access to a diagnostic system of the vehicle. The system includes a security module, such as a hardware security module, that includes an asymmetric key based cryptographic engine operative to authenticate the vehicle remote access device based on a public key associated with the vehicle remote access device and operative to establish a secure link with the vehicle remote access device. The system includes second logic operatively responsive to selectively prevent access to a diagnostic system of the vehicle in response to vehicle security context information received from the vehicle remote access device via the established secure link.

The logic, in one embodiment, is stored in a dedicated hardware security module (HSM). HSMs are designed to be tamper proof and therefore an attacker could not access, modify or bypass the security logic. If desired, the logical operations take advantage of a trusted execution environment (TEE) within the CPU of the hardware security module. TEE is a security standard by Global Platform which isolates critical logical functions into a secure and isolated space, further protecting security logic.

The context of diagnostic servicing being allowed or disallowed is commanded via the normal car owner's remote access device such as an electronic key fob issued by the automobile manufacturer or a smart phone application issued by the automobile manufacturer. The connectivity and communication protocol can utilize an existing technology such as Bluetooth, WiFi or another wireless technology of the automobile manufacturer's choice.

In order to secure the communication so that a thief cannot listen to the commands to replay them at a later time (known as a replay attack) the communications are protected. This can be achieved by implementing a SSL/TLS encrypted communication tunnel (link) between the key fob or smartphone app and the automobile connectivity technology that is receiving the commands (e.g., the HSM). By way of example, Federal Information Processing Standard FIPS 140-2 can be applied to the communications between the key fob or smartphone app and the HSM device to create a highly secure channel of communication.

As noted above, existing key fob or smart phone authentication into automobile systems utilize symmetric key technologies that have been defeated. The thief can find the shared secret between the key fob and the authentication system by investigating automobile computer system memory through the diagnostic port (OBD-II).

It is therefore important to employ strong asymmetric encryption such as Public Key Infrastructure (PKI), where the private key is stored securely in the automobile hardware security module, as well as in a secure element within the electronic key fob. For a smart phone, it is viable to store a private key within the smart phone. An analogy to this would be the Entrust Mobile Smart Credential app. A more secure smart phone implementation would take advantage of the secure element on the phone and also the trusted execution environment (TEE) built into many smart phones. Effectively, the electronic key fob or smart phone becomes the equivalent of a smart card, which authenticates into the ECU of an automobile. The two halves of the private key of the PKI system are stored in secure, tamper proof hardware. The PKI certificate authority and root of trust may be administered by the automobile manufacturer or other suitable third party. This would include certificate management, including device provisioning, user provisioning and certificate revocation. If a car changes ownership, the administration of ownership identity change would be managed by the automobile manufacturer.

The disclosed security implementation allows there to be a workaround for the use case of the driver losing the ability to start the car. This is accomplished by enabling the car to change modes by utilizing remote services offered by the automobile manufacturer. Systems such as General Motors OnStar and BMW ConnectedDrive are examples. These remote service commands would include a protected PKI authentication mechanism. They also protect the communication by using a SSL/TLS encrypted communication tunnel. In this way, the malicious actor cannot pretend to be the legitimate remote service.

Among other advantages, the automobile no longer trusts malicious commands that could allow for theft. Cryptographic key material does not have to be shared with a service center in order to authenticate access to the diagnostic system. This is a weakness of diagnostic authentication systems when diagnostic context logic is not present.

The disclosed security implementation need not displace other security defense layers and can work alongside existing automobile technologies.

In one example, logic is placed into the hardware security module to enable and disable the context of allowing diagnostic access. Secure connectivity to the logical state is implemented. Logic is also placed into an electronic key fob or a smart phone app. Both of these devices would be part of a normal automobile deployment by an automobile manufacturer. If these are lost, connectivity and logic from the automobile manufacturer's remote control system needs to be able to control the vehicle.

Operator authentication into the automobile ECU which controls the security logic is accomplished through the implementation of a public key infrastructure where the private keys are stored in hardware securing modules, as described.

If desired, another layer of security may also be provided by disabling commands emanating from a diagnostic system and a system of alarms may be employed when the automobile logic, such as the HSM, detects malicious conditions to any of the subsystems, such as braking systems or any other systems. This logic can be employed in addition to all other safety, security and theft prevention technologies.

In connection with this additional layer of security, a common method of attack is the repeated attempt to send a message into an automobile network, effectively causing what is known as a 'race condition' that is based on raising the probability that a malicious command will supersede a legitimate command or safety check.

Malicious commands may come from physical access to the OBD-II diagnostic port, entertainment system connectivity or through remote wireless connectivity. This highlights the need for internal electronic control unit logic, which would include:

Commands for the application of the braking system should never be allowed from the diagnostic system while driving. Any command repeated more than once in a short time frame (under 10 ms, or based on expected rates depending on normal driving conditions) should be identified as potentially malicious.

Any event of "information flooding" that causes denial of services within the vehicle electronics while driving would cause the automobile to attempt to warn the operator.

In one example, disclosed logic while the vehicle is driving, disallows all diagnostic access except for outbound information. Based on automobile design specifications, the logic does not allow any attempt to issue non-valid commands from the diagnostic system into the CAN, LIN, FlexRay or any other automobile network. A list of legitimate commands can be supplied by the automobile manufacturer for monitoring and stored in the security module.

If any of these logical conditions are detected by the logic, the vehicle operator may be notified to safety stop the vehicle. This warning can be sent through an independent and isolated system of notice. This can be a haptic system connected to the seat, steering wheel, brake, gas pedal and shift controller. This can also include dashboard alarm and also notice via the entertainment system.

Automobile hardware security modules are tamper proof electronic devices which can store data and logic in a way that is isolated from other electronic systems. They contain secure elements where this logic can be read from. The application of the logic can be executed within what is known as a Trusted Execution Environment (TEE) which is a further isolation of computer execution space from other electronic environments.

Some of the benefits of the context logic includes that the automobile no longer trusts malicious commands that could cause catastrophic consequences. Also, the threat surface of the automobile is reduced.

In one example, logic, such as a programmed processor is located in a hardware security module to disable commands emanating from the diagnostic system. A system of alarms is employed when the automobile logic detects malicious command conditions.

Figure 3:
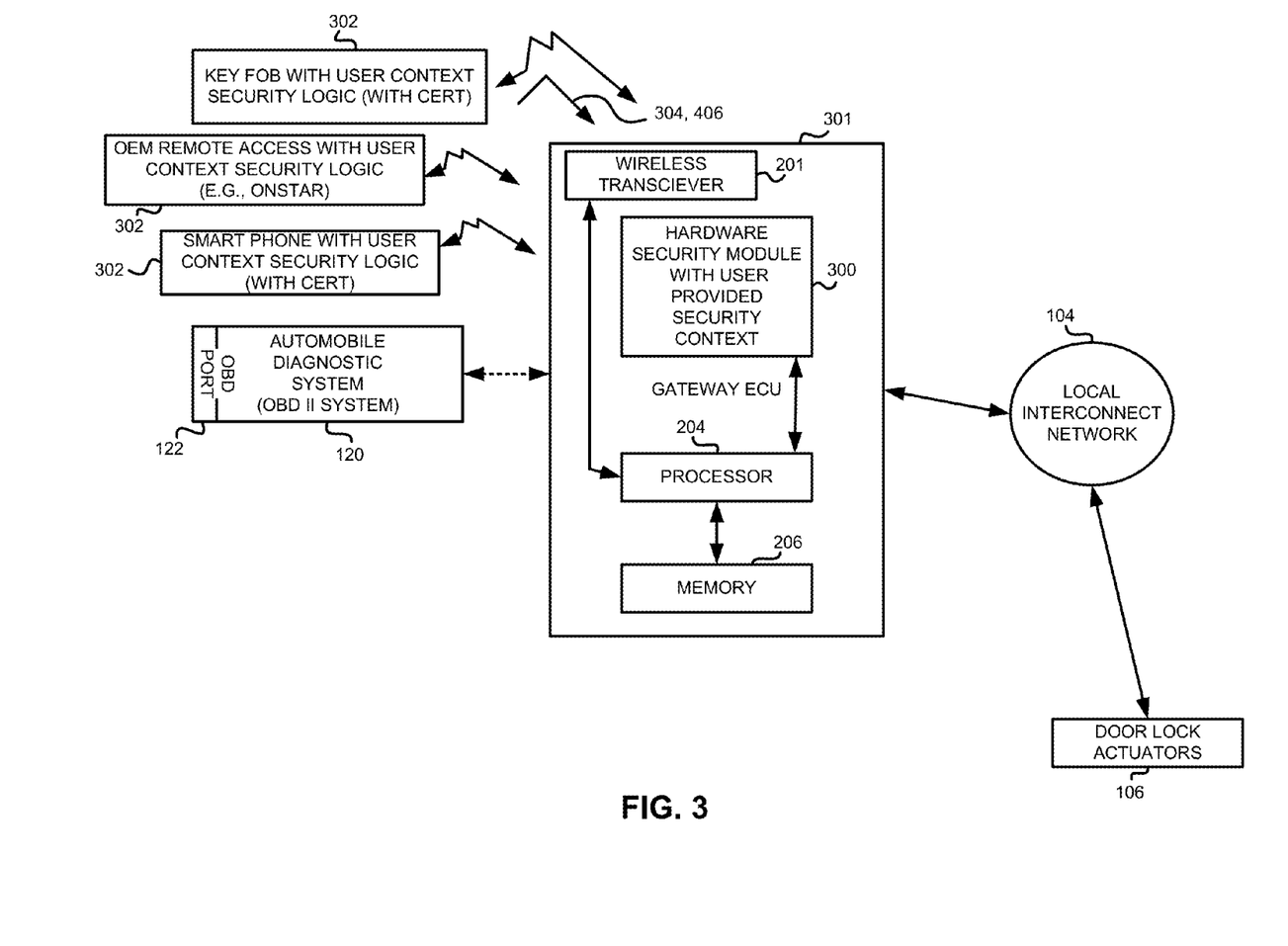
FIG. 3 is a block diagram illustrating one example of a hardware security module with user provided security context in accordance with one embodiment of the disclosure.

FIG. 3 illustrates one example of a hardware security module with user provided security context 300, in this example shown as part of a gateway ECU. However, it will be recognized that the hardware security module 300 may be located in any suitable point in the network as desired. The gateway ECU 301 in this example includes a wireless transceiver 201 and communicates with remote access devices 302 which may be, for example, a key fob, smart phone, or OEM remote access system with user context security logic. The user context security logic allows for a legitimate vehicle operator to notify the hardware security module 300 of vehicle security context information 405 sent by the vehicle remote access device and is sent, for example, through a secure wireless link 306. The vehicle security context information 405 may be, for example, an indication that the diagnostic system should be shut off.

Figure 4:
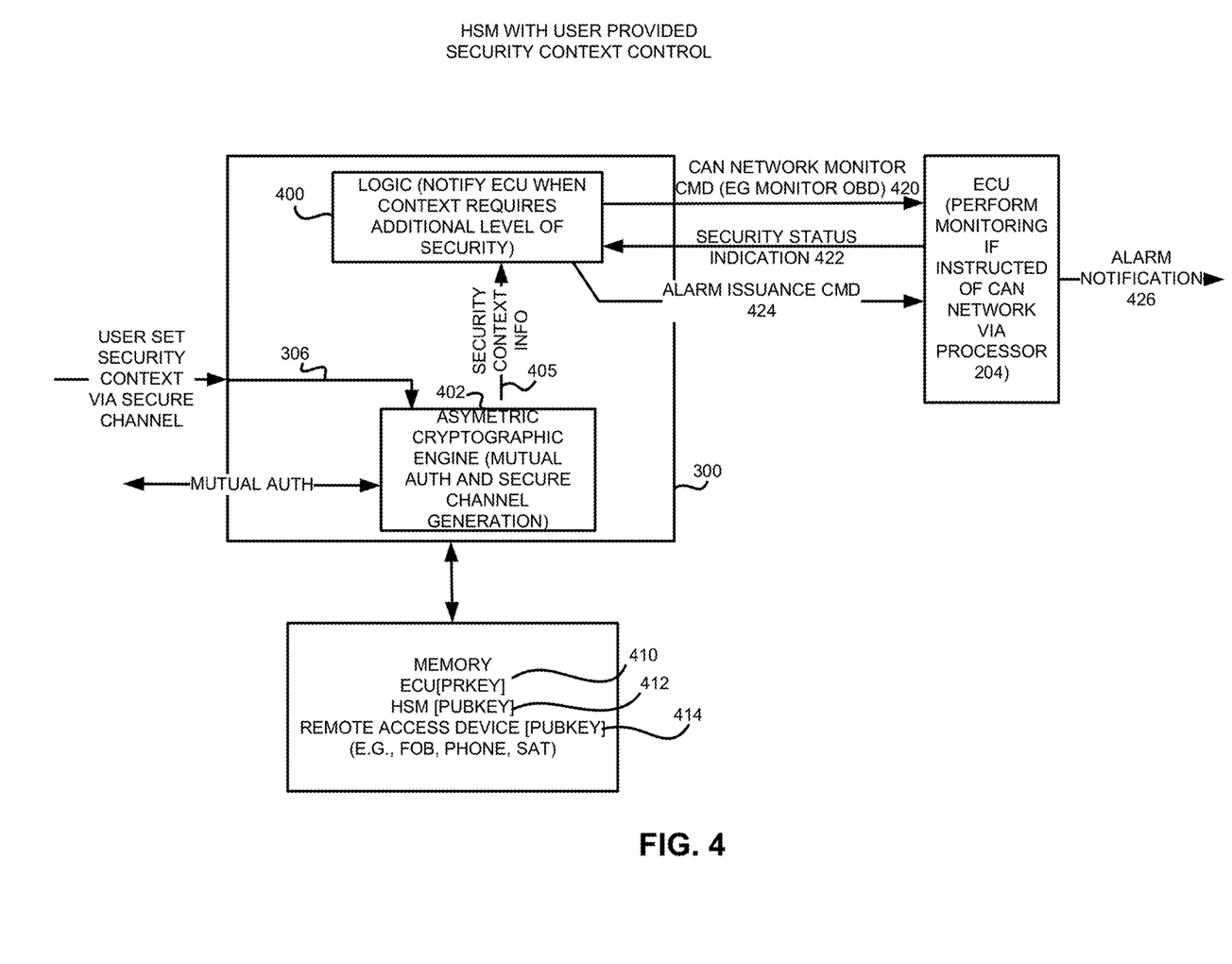
FIG. 4 is a block diagram of one example of an in-vehicle hardware security module with user provided security context control in accordance with one example set forth in the disclosure.

FIG. 4 illustrates in more detail one example of a security module 300 with user provided security context control. In this example, the security module 300 is a hardware security module which is a tamper proof electronic device which stores data and contains logic that is isolated from other electronic systems in the vehicle. In one example, the security module 300 includes logic 402 which may be, for example, a state machine, discrete logic, one or more processors executing programmable instructions stored in memory that when executed, cause the processor to operate as described herein, or any other suitable combination of hardware and software. The security module 300 also includes an asymmetric cryptographic engine 402 which may be a state machine, discrete logic or one or more processors that execute stored instructions that when executed, cause the processor to operate as an asymmetric cryptographic engine or any other suitable logic. If desired, the same processor can provide both the logic 400 and asymmetric cryptographic engine 402 if desired through execution of different executable code. The processors may be any suitable processors such as CPUs, digital signal processors, or any other suitable programmable processors. In addition, the methods claimed herein are performed electronically.

Non-transitory memory 404 may store the executable instructions when the logic 400 and asymmetric cryptographic engine 402 are implemented by one or more processors executing stored instructions. The memory 404 may be any suitable memory, such as RAM, ROM, or other storage medium, made from any suitable technology including memristor technology or any other suitable technology as known in the art. The memory 404 in addition stores a private key 410 of the gateway ECU 404, a public key 412 of the HSM 300, a public key 414 of a remote access device such as a key fob, smart phone, or any other suitable device. The asymmetric cryptographic engine 402 may be a PKI engine that utilizes the public and private key pairs to perform mutual authentication. In addition, other keys may be employed to provide a secure channel between a remote access device and the HSM for example, in accordance with FIPS-140-2 Standard, or any other suitable secure channel protocol. The asymmetric key based cryptographic engine 402 is operative to authenticate a vehicle remote access device based on a public key associated with the vehicle remote access device and also establishes a secure link with the vehicle remote access device. The logic 400 selectively prevents access to a diagnostic system of the vehicle in response to vehicle security context information 405 received from the vehicle remote access device via the established secure link or channel. As previously mentioned, the hardware security module 300 may be a tamper resistance hardware structure.

In operation, in one example, the asymmetric cryptographic engine 402 authenticates a vehicle remote access device (see FIG. 5) based on a public key 414 associated with the vehicle remote access device. The public key cryptographic engine also establishes a secure link or channel with the vehicle remote access device. The logic 400 selectively prevents access to a diagnostic system of the vehicle in response to the vehicle security context information 304 received from the vehicle remote access device via the established secure link. For example, if an operator of a key fob either selects via a graphic user interface or button on the key fob that the vehicle is off so that the operator wishes to logically have the vehicle diagnostic system effectively turned off, this vehicle security context information 405 which may be one or more bits sent via the secure channel to the HSM is then evaluated by the logic 400 and if the information indicates that a diagnostic system should be logically off, the logic 400 will instruct the ECU. For example, the logic 400 may issue a CAN network monitor command 420 requesting that the CAN network monitor the onboard diagnostic system bus or other data to determine whether access is being made to the vehicle diagnostic system. The ECU, via processor 204, then can perform monitoring of the CAN network for OBD access. This may be done, for example, by allowing or preventing an action of certificate signing commands sent to the diagnostic system. The diagnostic system will only respond to commands signed by a certificate stored in the HSM. The activity of signing commands only occurs when the security context is set to the enable mode ("Security context off"). If non-signed, false-signed commands reach the diagnostic system, the diagnostic system will not act on those commands. This can also include tapping the CAN network for traffic by using a dedicated network controller that logs and categorizes individual packets. This tapping is analogous to how an intrusion prevention system works in traditional IT systems. If the ECU, for example, detects that the OBD is being accessed, it can send a security status notification 422 to the logic 400. The logic 400 can then request that an alarm be issued via an alarm issuance command 424 and the ECU can then issue an alarm notification that may be sent back to the user's fob in the form of an audio and/or visual alarm and/or can also activate another alarm on the vehicle and if desired, send an alarm message to a security infrastructure that can contact police.

Figure 5:
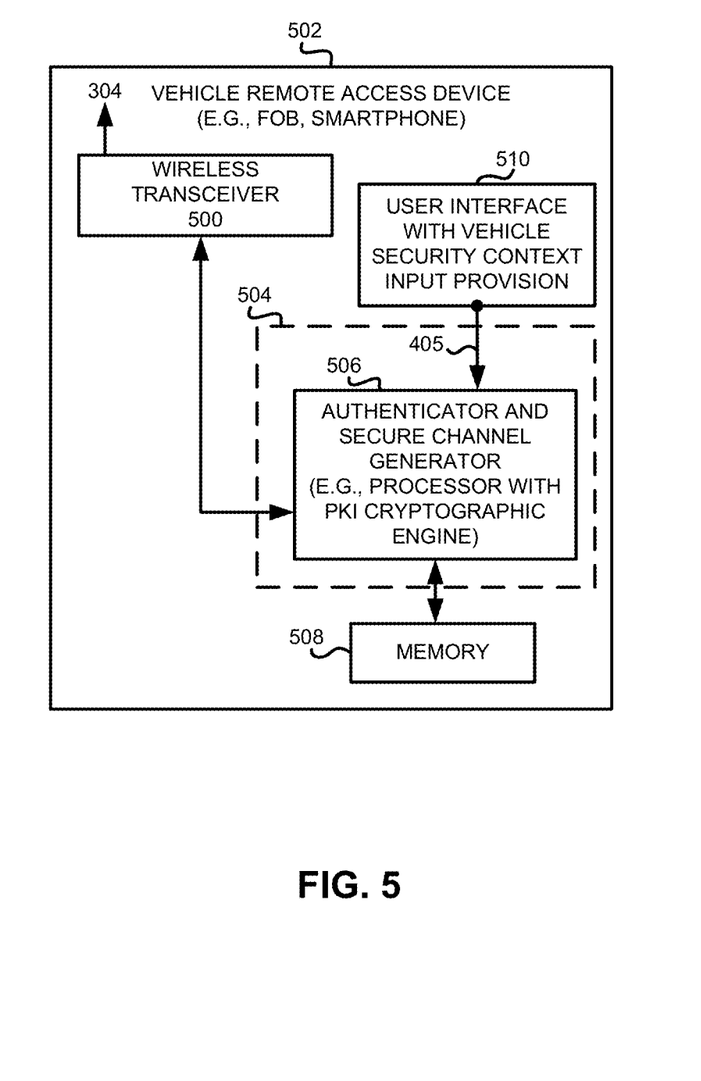
FIG. 5 is a block diagram illustrating one example of a vehicle remote access device in accordance with one embodiment set forth in the disclosure.

As shown in FIG. 5, the remote access device may be a key fob 502, smart phone or any other suitable device and as known in the art may include a wireless transceiver 500 such as a Bluetooth, near field transmitter, cellular transmitter, WiFi transceiver or any other suitable wireless transceiver 500 that may include one or more processors 504 or other suitable logic that forms user context security logic. The user context security logic may include an authenticator and secure channel generator 506 and is operative to provide selected user security context information 405 to the HSM 300 via a secure channel. In this example, a suitably programmed processor that is programmed as an asymmetric cryptographic engine that complements the cryptographic engine of the HSM is employed. In one example, this may be done by storing code in memory 508 that is executed by one or more processors 504. However, it will be recognized that discrete logic, state machines, or any suitable combination of hardware and software may be employed. In addition, a user interface 510 such as one or more buttons, graphics user interfaces, microphone, speaker, or any other suitable user interface is electronically coupled to the cryptographic engine to provide vehicle security context input information provision to allow a user to select that an added layer of security is desired by the user or vehicle operator such that not only is the vehicle locked, for example, but in addition, the vehicle operator wishes to indicate that the context of the vehicle should be such that the diagnostic system should also be effectively off and not accessible. The vehicle security context information 405 may then be transmitted via the wireless transceiver 500 via a secure channel as previously noted.

It will be recognized that the user interface 510 may be an existing button on a fob, for example, that may be pressed and held down for an extended period of time to select security context input information as being "on" so that the diagnostic system in the vehicle is prevented from being accessed. Alternatively, separate button either mechanical or through a graphic user interface may be employed. In addition, audible commands may be utilized, biometric input may be utilized, or any other suitable activation mechanism as desired.

Figure 6:
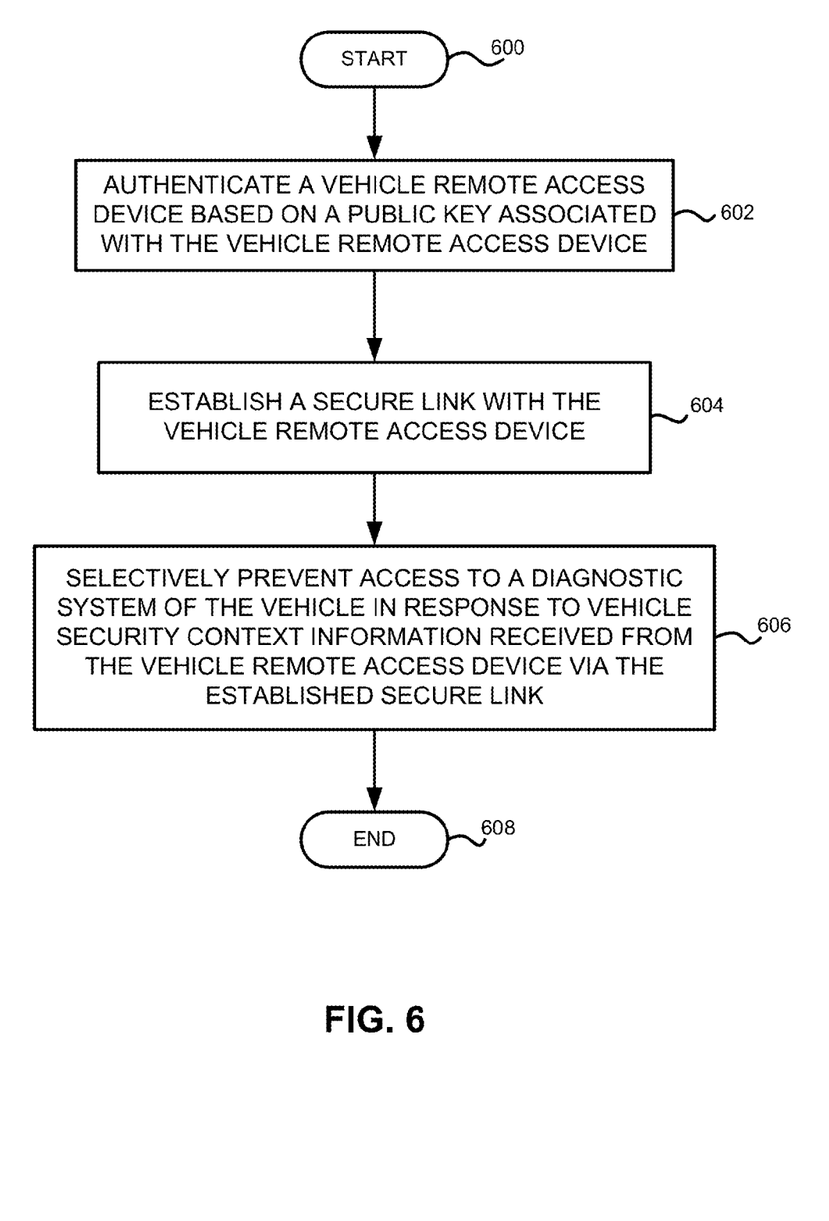
FIG. 6 is a flowchart illustrating one example of a method of operation of the hardware security module shown in FIGS. 3 and 4.

FIG. 6 is a flowchart illustrating one example of a method performed by a device in a vehicle which begins at block 600. The process may be started, for example, by a user activating a button or other selection mechanism on a vehicle remote access device to initiate the vehicle security context mode. It may also start automatically when the key fob or smart phone is within a certain range of the vehicle if desired. As shown in block 602, the method includes authenticating a vehicle remote access device, such as a key fob or smart phone, based on a public key associated with the vehicle remote access device. As shown in block 604, the method includes establishing a secure link, such as a TSL secure tunnel, with the vehicle remote access device. The method includes selectively preventing access, shown in block 606, to a diagnostic system of the vehicle in response to vehicle security context information received from the vehicle remote access device via the established secure link. The method may be carried out, for example, by logic in the vehicle and in one example, a security module such as an HSM. The method may end as shown in block 608.

Figure 7:
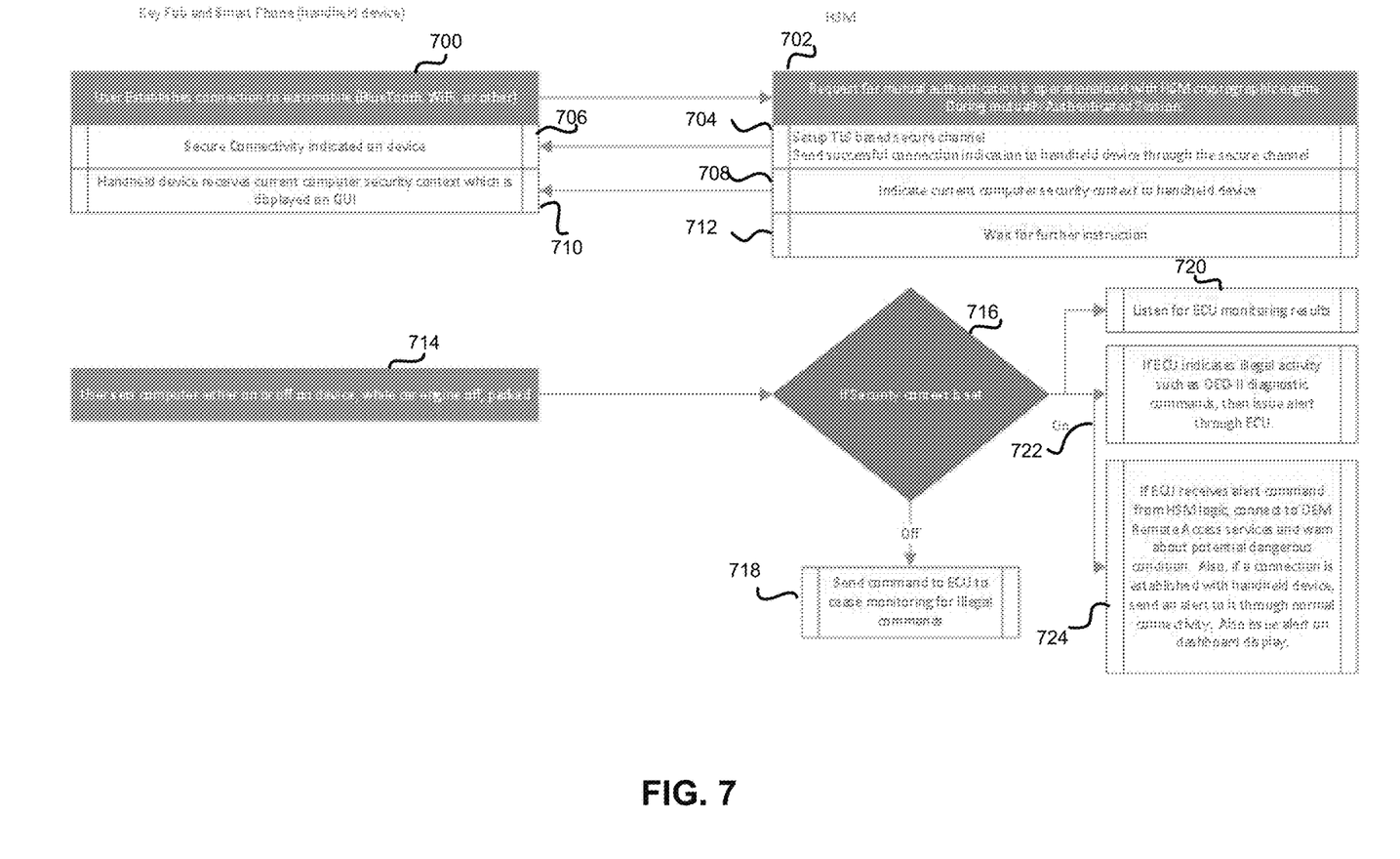
FIG. 7 is a flowchart illustrating one example of the operation of a vehicle remote access device and a security module in accordance with one aspect of the disclosure.

FIG. 7 illustrates one example of a method of operation between a remote access device and an HSM in accordance with one embodiment. A user establishes a connection, block 700, to the vehicle via a Bluetooth, WiFi or other wireless technology by, for example, activating a button on a fob or through a graphic user interface and requests of the HSM to perform mutual authentication 702 with the cryptographic engine of the HSM. There are standard asymmetric authentication methods and protocols available to automotive OEMs. An example for remote, wireless mutual challenge response would be the Elliptic Curve Cryptosystem (ECC) ID-based remote authentication scheme. The cryptographic steps have been standardized. From a goal perspective, the protocols steps are: mutual authentication of the server and the user, establish a secret authentication key to protect the data used in mutual authentication, establish non-repudiation of origin by the user and the server for relevant data sent from the user to the server and vice versa agreement on a secret session key, which will be used to encrypt data communication.

If the key fob is authenticated by the HSM, the HSM then sets up a secure channel 704, for example, such as a TLS and the HSM will send a successful connection indication to the fob through the secure channel. The fob then activates, for example, a light or other indication if desired on the fob indicating that secure connectivity is in place 706. The HSM then indicates the current computer security context 708 of the vehicle to the handheld device. By way of example, this may indicate a symbol of a computer component overlaid by a symbol of a red lock to highlight the condition that the car is not allowing diagnostic control and is protected. Another example would be the same computer component not overlaid by a symbol of a lock, beside a yellow exclamation point, which would highlight the condition that the diagnostic computer system accepting commands and therefore the user is cautioned not to leave their car parked in this condition. The handheld device may then display 710 the current computer security context on a GUI or through another suitable button or indication. The HSM then waits for further instructions 712. If the user decides to provide additional vehicle security context 714 by, for example, selecting an on or off button while the car engine is off or parked, the vehicle security context information is communicated to the HSM through the secure channel and if the security context is not set 716, the HSM may send a command to the ECU to cease monitoring for illegal commands to the diagnostic system 718. However, if the vehicle security context is set, the HSM indicates for the ECU to perform monitoring and listen for monitoring results of the diagnostic system 720. If the ECU indicates illegal activity 722, such as an OBD-2 diagnostic command being detected, then the HSM will inform the ECU to issue an alert. If the ECU receives an alert command from HSM logic, then the ECU will connect to the OEM remote access services and warn about potential dangerous conditions 724. Also, if a connection is established with the handheld device, an alert can be sent to the remote access device through normal connectivity and need not use a secure channel. An issue alert can also be displayed on a dashboard display of the vehicle via the ECU if desired.

Figure 8:
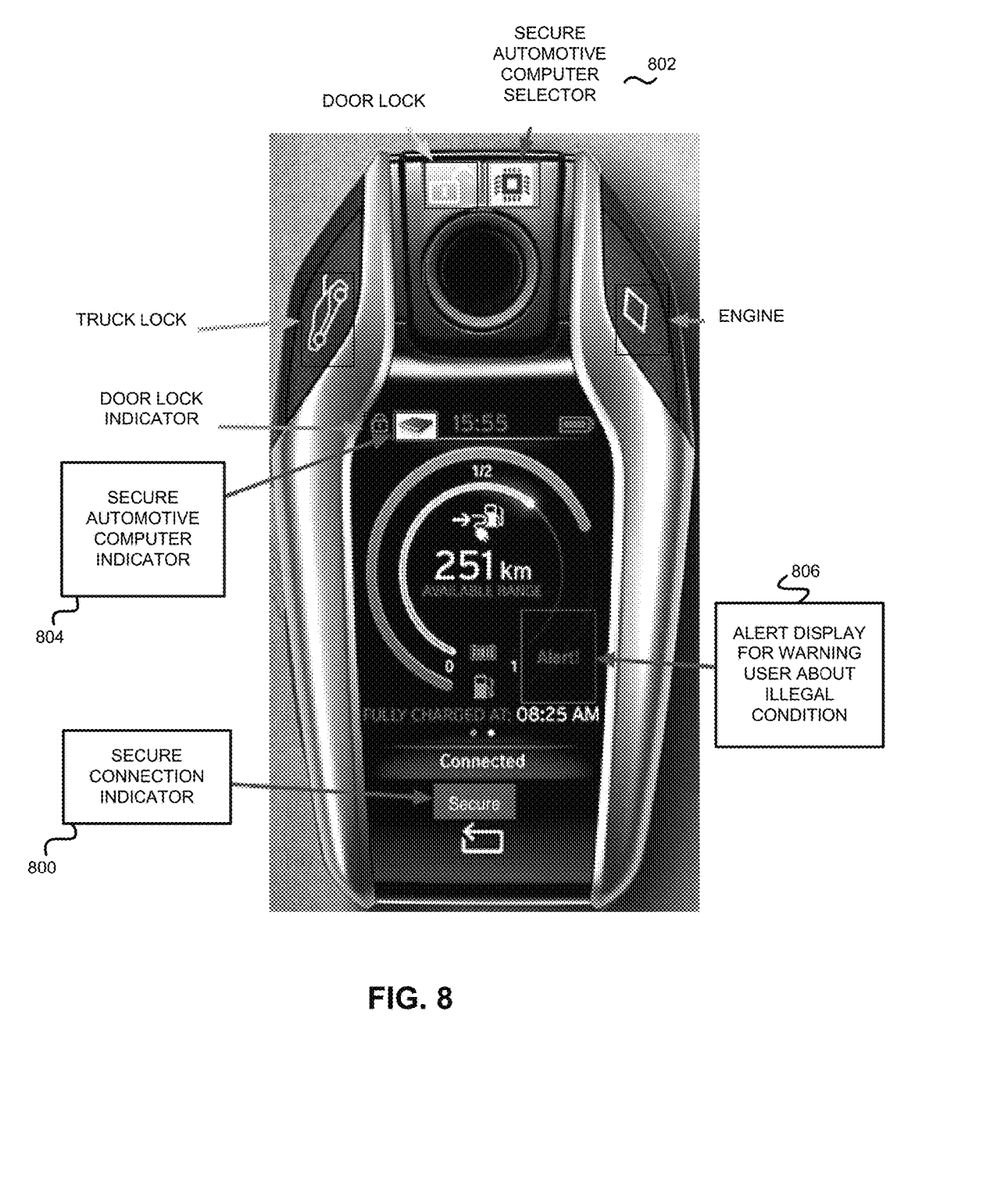
FIG. 8 illustrates one example of a key fob in accordance with one aspect of the disclosure.
Figure 9:
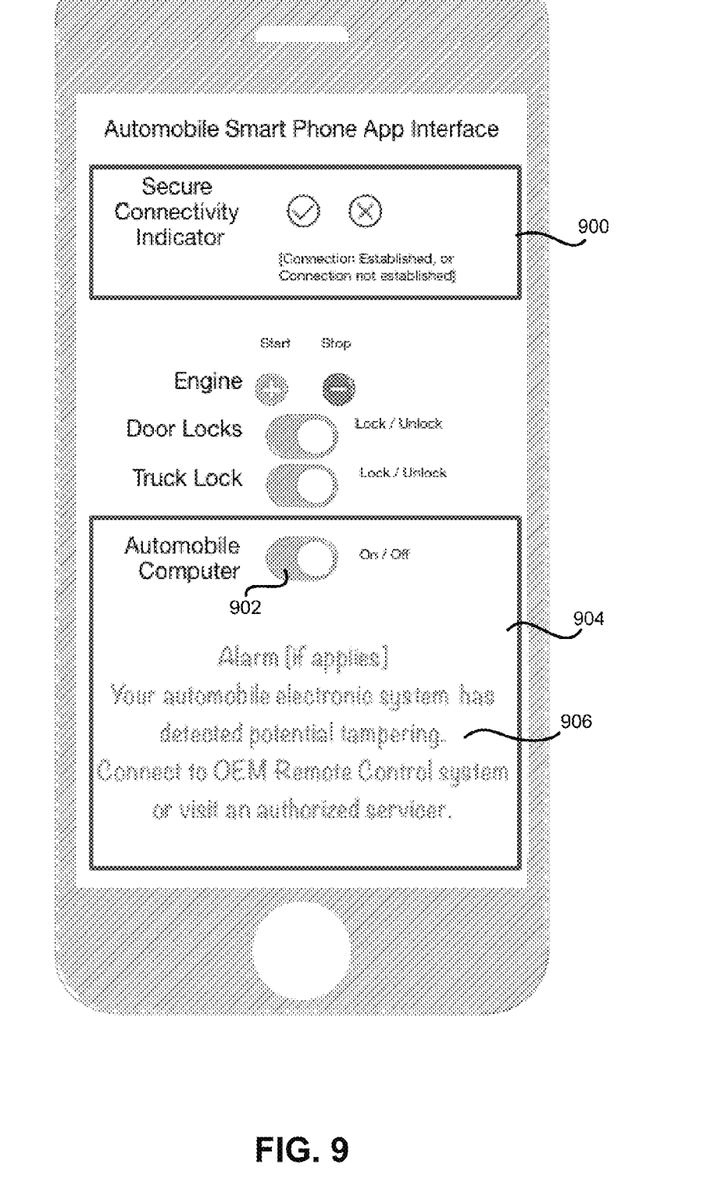
FIG. 9 is an illustration of a smart phone employing a graphic user interface in accordance with one example set forth in the disclosure.

FIGS. 8 and 9 are diagrammatic illustrations of a key fob and smart phone respectively that employ the vehicle security context information provision described above. The remote access device, in these examples, include a secure connection indicator 800 and 900 which shows a user that the secure channel has been established between the remote access device and the HSM. In addition, a secure automotive computer selector 802 and 902 are used to allow a user to activate the vehicle secure context mode to indicate that the vehicle diagnostic system should not be accessible. If the activation of the vehicle security context information has been properly carried out, the user is notified to the secure automotive computer indicator 804 and 904. In addition, an alert or alarm warning, either visual, audible or both, as shown as 806 and 906 which is activated in the event that the HSM has detected accessing of the diagnostic system during a time where the secure automotive computer indicator has been activated.

Figure 10:
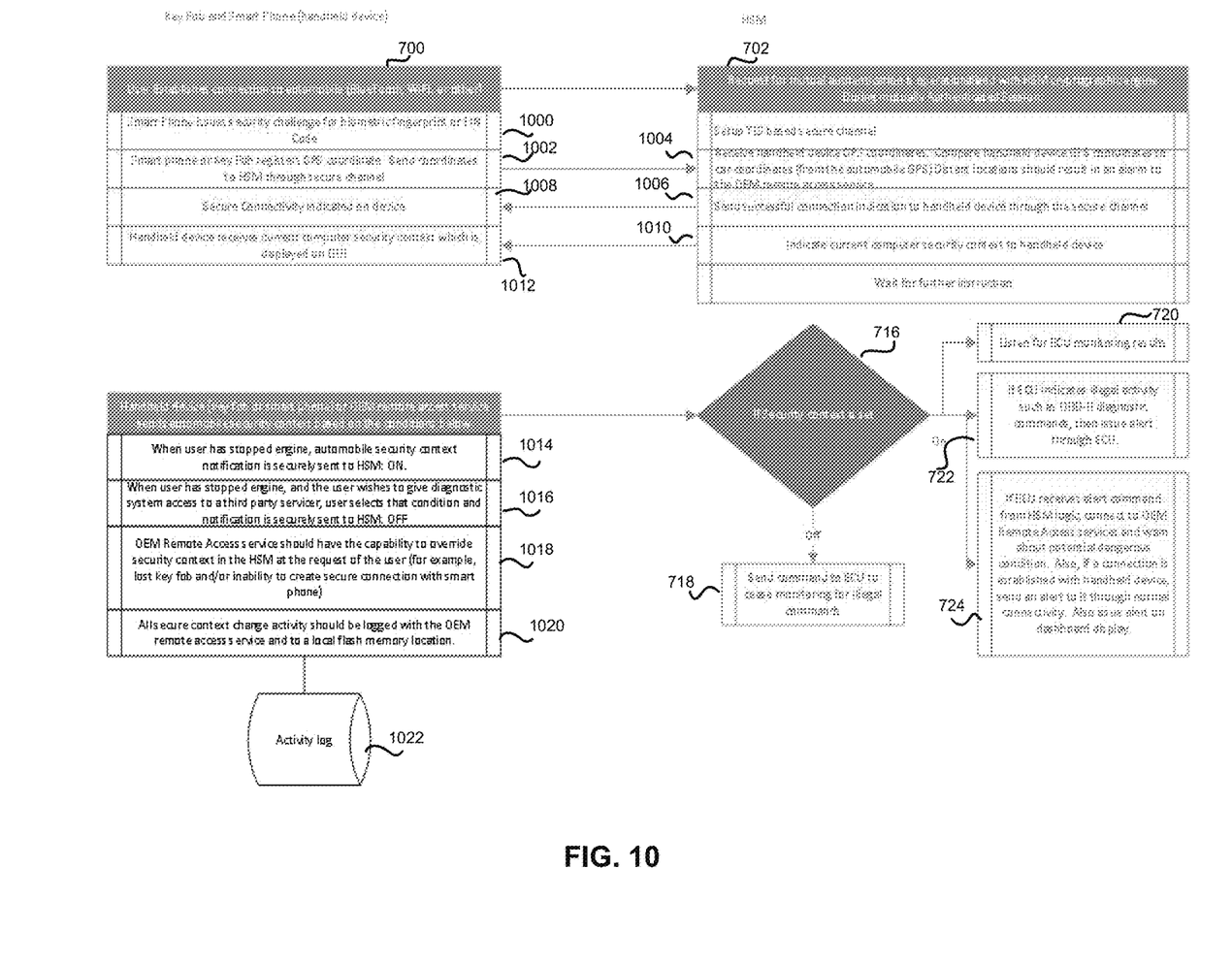
FIG. 10 is a flowchart illustrating one example of the operation of a vehicle remote access device and a security module in accordance with one aspect of the disclosure.

FIG. 10 is a flow diagram illustrating another embodiment of a system wherein location information of a smart phone or key fob may be employed and/or biometric information of the user. As shown, a smart phone, when used, may issue a security challenge for a biometric fingerprint or PIN code by the user as shown in block 1000. The HSM may set up a TLS base secure channel if mutual authentication has been approved, the biometric fingerprint information is an additional level of security. A smart phone or key fob may register if desired, GPS coordinates and send the GPS coordinates to the HSM through the secure TLS channel as shown in block 1002. The received GPS coordinates are compared to the car coordinates, such as from the automobile GPS and if the locations are too distant, then an alarm is sent to the OEM remote access service as shown in block 1004 The OEM remote access service would contact the user of the automobile to ensure that this is an intended operation. If this is not intended by the legitimate user, the car would be immobilized or tracked by the OEM remote access service, depending on the OEM specific policies. A successful connection indication to the handheld device is then sent through the secure channel as shown in block 1006 which is then indicated on the key fob or smart phone as shown in block 1008. An indication of the current computer security context may be sent to the handheld device as shown in block 1010 which then may be displayed on a GUI or otherwise indicated to the user as shown in block 1012. If the remote access device or OEM remote access service sends vehicle security context information, it may be done based on a number of conditions. These are shown in blocks 1014, 1016, 1018 and 1020. These activities may be logged in memory of the remote access device as shown in block 1022. For example, when a user has stopped an engine, the automobile security context notification may be indicated to be "on" and is sent in a secure channel to the HSM. When a user has stopped the engine and the user wishes to give diagnostic system access to a third party servicer, the user may select that condition and notification is securely sent to the HSM indicating that the vehicle security context information is "off". As shown in block 1018, in another example, an OEM remote access service to have the capability to override security context in the HSM at the request of the user, for example, if there is a lost key fob or inability to create a secure connection with the smart phone. As shown in block 1020, the secure context charge activity is logged with the OEM remote access service and to a local memory location if desired.

Figure 11:
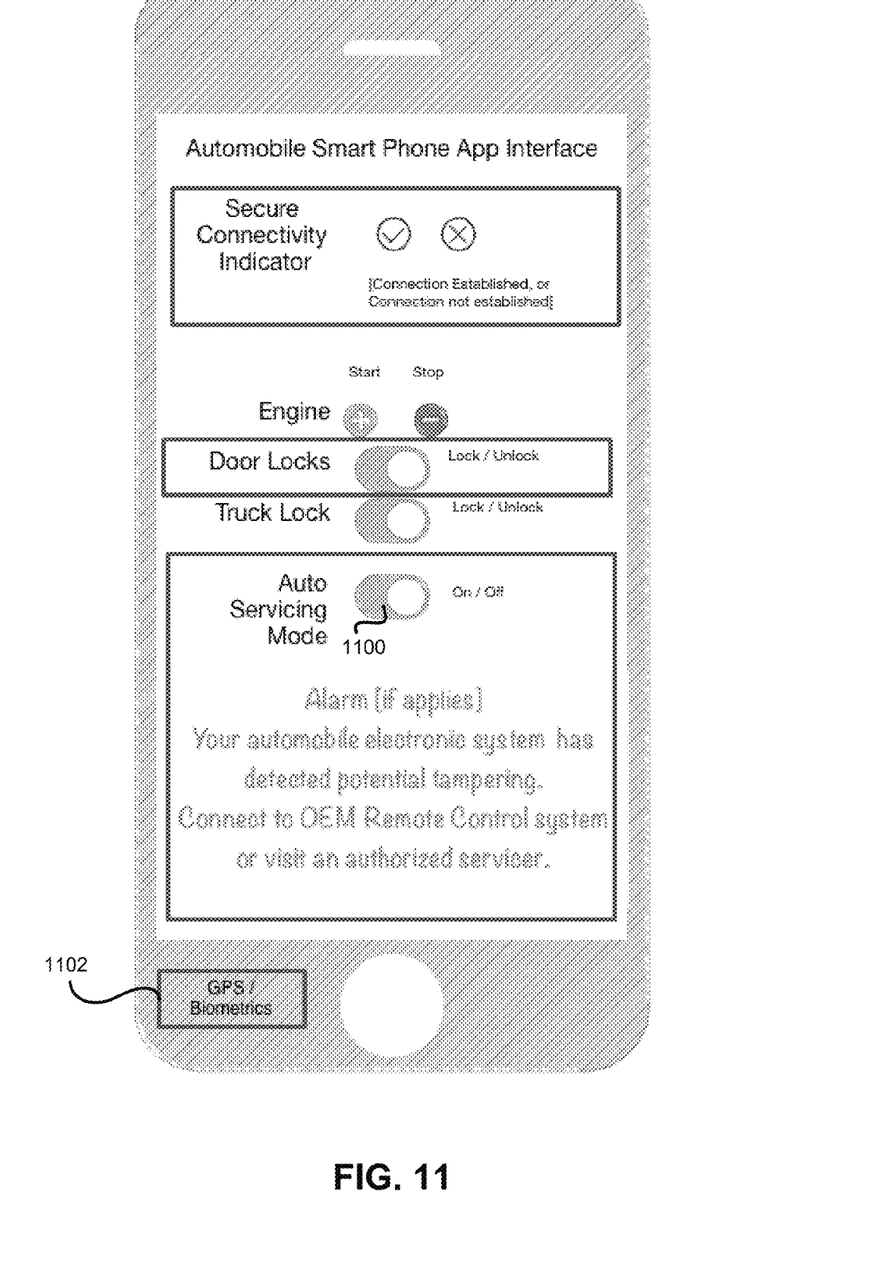
FIG. 11 is an illustration of a smart phone employing a graphic user interface in accordance with one example set forth in the disclosure.
Figure 12:
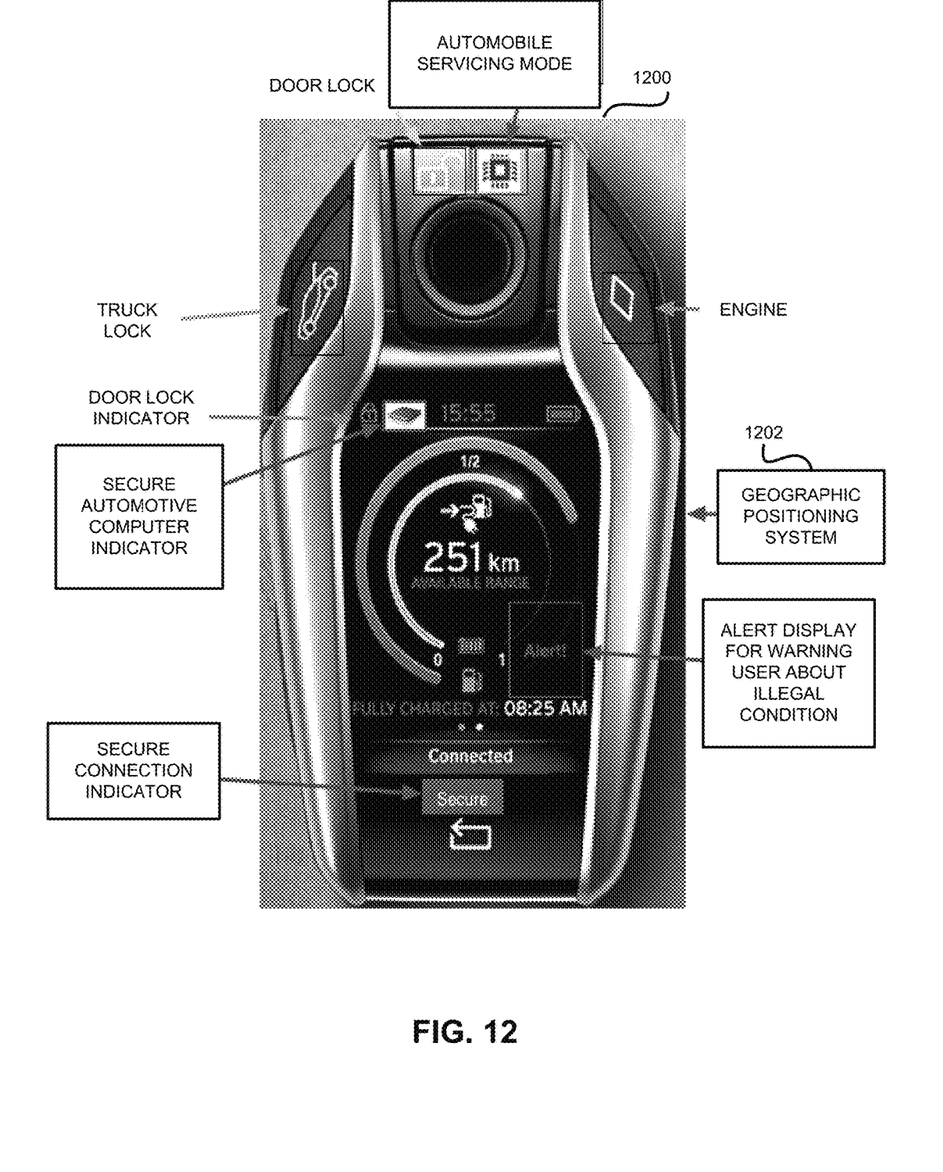
FIG. 12 illustrates one example of a key fob in accordance with one aspect of the disclosure.

As shown in FIGS. 11 and 12, the auto servicing selector 1100 and 1200 are shown to allow, for example, a user to select that a diagnostic servicing can occur. A GPS and/or biometrics interface may also be provided as shown in 1102 and 1202. Accordingly, these devices may be employed with the operation shown, for example, in FIG. 10.

To summarize in part, automobile electronic systems trust the commands that they are issued. Automobiles typically cannot differentiate whether commands are issued from their legitimate operator or from a malicious thief. This problem is solved when a legitimate operator of the automobile is able to signal intention to the automobile. Effectively, the context of whether a car driver wants to drive or park the automobile is part of the defensive security.

If a legitimate operator of an automobile wants to park for a period of time, it can be assumed that the intention of the operator is that the car doors will be locked and engine will be stopped, and additionally, the automobile will not be accepting commands from the diagnostic system until the driver issues a command to unlock the doors and start the engine.

The exception to this would be if the vehicle operator intends for the car to be serviced. The diagnostic port would be legitimately accessed. The automobile owner or driver is allowed to issue a command to the automobile to put it into a mode where diagnostic servicing is allowed.

In another embodiment, the blocking of non-legitimate commands during legitimate operator operation may also be provided in combination so that, for example, the hardware security module may disable commands that emanated from the diagnostic system. Other advantages will be recognized by those of ordinary skill in the art.

Among other advantages, an additional layer of vehicle security is provided that includes an asymmetric key based mutual authentication operation between a remote access device and a vehicle security system. An additional secure channel such as an SSL or TLS channel is set up between an HSM and the remote access device to issue additional commands or provide vehicle security context information by a vehicle operator indicating, for example, that a vehicle diagnostic system should be logically off. This may be in addition to information indicated, for example, that the vehicle is parked and/or locked. As such, both a physical locking of the vehicle is performed and a logical locking of the diagnostic system is performed.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An apparatus for providing vehicle security for a vehicle comprising:
   a security module comprising:
   an asymmetric key based cryptographic engine operative to authenticate a vehicle remote access device based on a public key associated with the vehicle remote access device and operative to establish a secure link with the vehicle remote access device; and
   logic operatively responsive to selectively prevent access to a diagnostic system of the vehicle in response to vehicle security context information received from the vehicle remote access device via the established secure link.

2. The apparatus of claim 1 wherein the security module comprises a hardware security module with a tamper resistant hardware structure.

3. The apparatus of claim 1 wherein the logic selectively prevents access to the diagnostic system of the vehicle by at least allowing or preventing an action of certificate singing commands sent to the diagnostic system.

4. A vehicle remote access device comprising:
   a wireless transceiver;
   logic, operatively coupled to the wireless transceiver, operative to facilitate public key based authentication with a vehicle electronic control unit;
   a user interface operatively coupled to the logic, and operative to provide vehicle security context information for the vehicle electronic control unit to prevent access to a diagnostic system of the vehicle.

5. A method performed by a device in a vehicle comprising:
   authenticating, by the device in the vehicle, a vehicle remote access device based on a public key associated with the vehicle remote access device;
   establishing, by the device in the vehicle, a secure link with the vehicle remote access device; and
   selectively preventing, by the device in the vehicle, access to a diagnostic system of the vehicle in response to vehicle security context information received from the vehicle remote access device via the established secure link.

6. A vehicle system comprising:
   a vehicle remote access device comprising:
   a wireless transceiver;
   first logic, operatively coupled to the wireless transceiver, operative to facilitate public key based authentication with a vehicle electronic control unit;
   a user interface operatively coupled to the logic, and operative to provide vehicle security context information for the vehicle electronic control unit to prevent access to a diagnostic system of the vehicle; and
   a security module comprising:
   an asymmetric key based cryptographic engine operative to authenticate the vehicle remote access device based on a public key associated with the vehicle remote access device and operative to establish a secure link with the vehicle remote access device; and
   second logic operatively responsive to selectively prevent access to a diagnostic system of the vehicle in response to vehicle security context information received from the vehicle remote access device via the established secure link.

7. The apparatus of claim 1 wherein the security module, the asymmetric key based cryptographic engine and logic are in the vehicle.

8. The vehicle remote access device of claim 4 wherein the vehicle remote access device comprises a handheld vehicle remote access device.

9. The vehicle remote access device of claim 8 wherein the handheld vehicle remote access device comprises a key fob.

10. The vehicle system of claim 6 wherein the vehicle remote access device comprises a handheld vehicle remote access device and wherein the security module is an in-vehicle security module.

* * * * *